US010043508B2

(12) United States Patent
Park et al.

(10) Patent No.: US 10,043,508 B2
(45) Date of Patent: Aug. 7, 2018

(54) META ATOM FOR CONTROLLING ACOUSTIC PARAMETERS AND METAMATERIALS COMPRISING THE SAME

(71) Applicant: Seoul National Universtity R&DB Foundation, Seoul (KR)

(72) Inventors: Nam Kyoo Park, Seoul (KR); Suk Mo Koo, Goyang-si (KR); Choon Lae Cho, Seoul (KR)

(73) Assignee: Seoul National University R&DB Foundation, Goyang-si, Gyeonggi-do (KR)

( * ) Notice: Subject to any disclaimer, the term of this patent is extended or adjusted under 35 U.S.C. 154(b) by 71 days.

(21) Appl. No.: 15/364,819

(22) Filed: Nov. 30, 2016

(65) Prior Publication Data

US 2017/0316772 A1 Nov. 2, 2017

(30) Foreign Application Priority Data

Apr. 29, 2016 (KR) ........................ 10-2016-0053261

(51) Int. Cl.

*G10K 11/172* (2006.01)
*F16F 15/02* (2006.01)
*F16F 7/00* (2006.01)
*G10K 11/16* (2006.01)

(52) U.S. Cl.

CPC .................................. *G10K 11/172* (2013.01)

(58) Field of Classification Search

CPC ....... G10K 11/172; G10K 11/16; F16F 15/02; F16F 15/022; F16F 15/04; F16F 9/306; H01P 7/00; H01P 7/10; H01P 7/105; H01P 7/088

See application file for complete search history.

(56) References Cited

U.S. PATENT DOCUMENTS 6,478,110 B1 * 11/2002 Eatwell .................. G10K 11/16 181/207
7,267,196 B2 * 9/2007 Mathur ............... F16F 15/0237 181/198
7,553,533 B2 * 6/2009 Manfredotti .............. B64C 1/40 181/207
8,172,036 B2 * 5/2012 Tanielian ............. G10K 11/162 181/206

(Continued)

FOREIGN PATENT DOCUMENTS

DE 102015103936 * 9/2016 ............... E04B 1/82
KR 10-2012-0007819 A 1/2012

(Continued)

*Primary Examiner* — Edgardo San Martin

(74) *Attorney, Agent, or Firm* — Wolf, Greenfield & Sacks, P.C.

(57) ABSTRACT

A meta atom for controlling acoustic parameters and metamaterials comprising the same, which includes a first resonator assembly having a pair of resonators configured of two resonators disposed apart from each other with respect to an axis direction; a second resonator assembly positioned inside the pair of resonators included in the first resonator assembly, and having at least one resonator; and partitions connected between the first resonator assembly and the second resonator assembly, and supporting the first and second resonator assembly.

15 Claims, 16 Drawing Sheets

(56) References Cited

U.S. PATENT DOCUMENTS

| | | | | |
|---|---|---|---|---|
| 8,579,073 | B2 * | 11/2013 | Sheng | G10K 11/172<br>181/207 |
| 8,616,330 | B1 * | 12/2013 | McKnight | G10K 11/16<br>181/207 |
| 8,752,667 | B2 * | 6/2014 | McKnight | G10K 11/172<br>181/207 |
| 8,833,510 | B2 * | 9/2014 | Koh | F16F 15/02<br>181/207 |
| 8,857,564 | B2 * | 10/2014 | Ma | G10K 11/18<br>181/284 |
| 8,876,091 | B2 * | 11/2014 | Manfredotti | F16F 7/10<br>181/207 |
| 9,248,899 | B2 * | 2/2016 | Caillet | B64C 1/40 |
| 9,275,622 | B2 * | 3/2016 | Claeys | G10K 11/172 |
| 9,466,283 | B2 * | 10/2016 | Yang | G10K 11/175 |
| 9,472,179 | B1 * | 10/2016 | Cai | G10K 11/172 |
| 9,520,121 | B2 * | 12/2016 | Sheng | G10K 11/172 |
| 9,659,557 | B2 * | 5/2017 | Yang | G10K 11/172 |
| 9,711,129 | B2 * | 7/2017 | Sheng | G10K 11/02 |
| 2011/0240402 | A1 * | 10/2011 | Chou | F16F 7/104<br>181/207 |
| 2017/0040014 | A1 * | 2/2017 | Simon | G10K 11/178 |

FOREIGN PATENT DOCUMENTS

| | | | | |
|---|---|---|---|---|
| KR | 10-2012-0123746 A | | 8/2013 | |
| WO | WO 2017041283 A1 | * | 3/2017 | G10K 11/172 |
| WO | WO 2017093690 A1 | * | 6/2017 | G10K 11/04 |
| WO | WO 2017093693 A1 | * | 6/2017 | G10K 11/04 |

* cited by examiner

META ATOM FOR CONTROLLING ACOUSTIC PARAMETERS AND METAMATERIALS COMPRISING THE SAME

CROSS-REFERENCE TO RELATED APPLICATION

This application claims priority to and the benefit of Korean Patent Application No. 10-2016-0053261, filed on Apr. 29, 2016, the disclosure of which is incorporated herein by reference in its entirety.

BACKGROUND

Field of the Invention

The present invention relates to meta atoms for controlling acoustic parameters and metamaterials comprising the same, and more particularly, to meta atoms for controlling acoustic parameters and metamaterials comprising the same which may control wave parameters and bianisotropy of an acoustic wave.

Discussion of Related Art

Metamaterials are artificial materials designed with properties which are difficult for natural materials to have such as a zero refractive index, a negative refractive index, a high refractive index and the like, and make wave parameters which are difficult to realize through natural materials possible. For this reason, metamaterials have received the spotlight as a novel method for adjusting a wave's behavior. Particularly, since various phenomena of a wave including reflection, transmission can be adjusted through distribution of wave parameters such as transformation optics, metasurfaces and the like, research thereon has been actively done.

Meanwhile, governing equations describing the various phenomena of a wave are represented by bianisotropy describing interaction strength between two fields as well as two fields and two wave parameters corresponding to each. Bianisotropic materials, in which the exchange of energy between two fields occurs, have a characteristic in which impedance a wave receives is different according to a propagation direction of a wave. For an electromagnetic wave, it is known that bianisotropy can be realized through electric and magnetic field coupling using a Ω-structure, a helical structure and the like.

Meanwhile, the background of the present invention is disclosed in Korean Patent Publication No. 10-2012-0007819 (Jan. 25, 2012).

SUMMARY OF THE INVENTION

However, conventional research on metamaterials has mainly been focused on electromagnetic wave parameters, and little research on acoustic metamaterials has been conducted.

Also, general metamaterial structures have a problem that when a design value is adjusted in order to adjust one wave parameter, variations of other wave parameters are inevitable. Therefore, in order to design metamaterial structures having desired wave parameters (or scattering characteristics), it has been necessary to go through a series of trial and error to check all metamaterial parameters with respect to a wide range of design values. This is because an artificial resonant mode used in existing metamaterial structures for changing material parameters has an influence on a eigenmode of two wave parameters at the same time.

In addition, bianisotropy is a characteristic which has not been reported in acoustic area, and little has been known about a method for electromagnetically realizing bianisotropy.

The present invention has an object to provide acoustic metamaterial structures which can each independently control bianisotropy and two wave parameters of an acoustic wave (mass density and bulk modulus) in a range from negative to positive.

A meta atom according to the present invention includes a first resonator assembly having a pair of resonators configured of two resonators disposed apart from each other with respect to an axis direction; a second resonator assembly positioned inside the pair of resonators included in the first resonator assembly, and having at least one resonator; and partitions connected between the first resonator assembly and the second resonator assembly, and supporting the first and second resonator assemblies.

In the present invention, the two resonators in the pair of resonators included in the first resonator assembly may be disposed on the same axis.

A meta atom according to the present invention may further include partitions or resonators disposed on an axis perpendicular to the axis on which the two resonators are disposed.

In the present invention, resonators included in the second resonator assembly may be disposed at radial positions from the center of a meta atom.

In the present invention, resonators included in the second resonator assembly may be disposed at the same distance from the center of a meta atom.

In the present invention, the second resonator assembly may include a pair of resonators disposed at positions facing the pair of resonators included in the first resonator assembly.

In the present invention, one or more of the pair of resonators included in the first resonator assembly and the pair of resonators included in the second resonator assembly may have an asymmetric resonance characteristic.

In the present invention, a pair of resonators having an asymmetric resonance characteristic may have different effective masses from each other.

In the present invention, the second resonator assembly may further include a pair of resonators disposed perpendicularly to the pair of resonators disposed at the facing positions.

In the present invention, resonators included in the first and second resonator assemblies may be formed as composite structures of one or two or more elements, wherein the element may be a bar, a membrane, a plate, or a Helmholtz's resonator.

In the present invention, the partitions may block the transmission of an acoustic wave.

In the present invention, the meta atom may be placed in the other larger unit cell, wherein the unit cell consists of background media is extended from the first resonator assembly.

In the present invention, the meta atom may control wave parameters and bianisotropy of an acoustic wave by adjusting a type of fluid, ambient pressure of a fluid, an area of a cell, or a volume of a cell inside individual cells surrounded by resonators and partitions.

Metamaterials according to an exemplary embodiment of the present invention may be acoustic couplers or acoustic metasurfaces.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
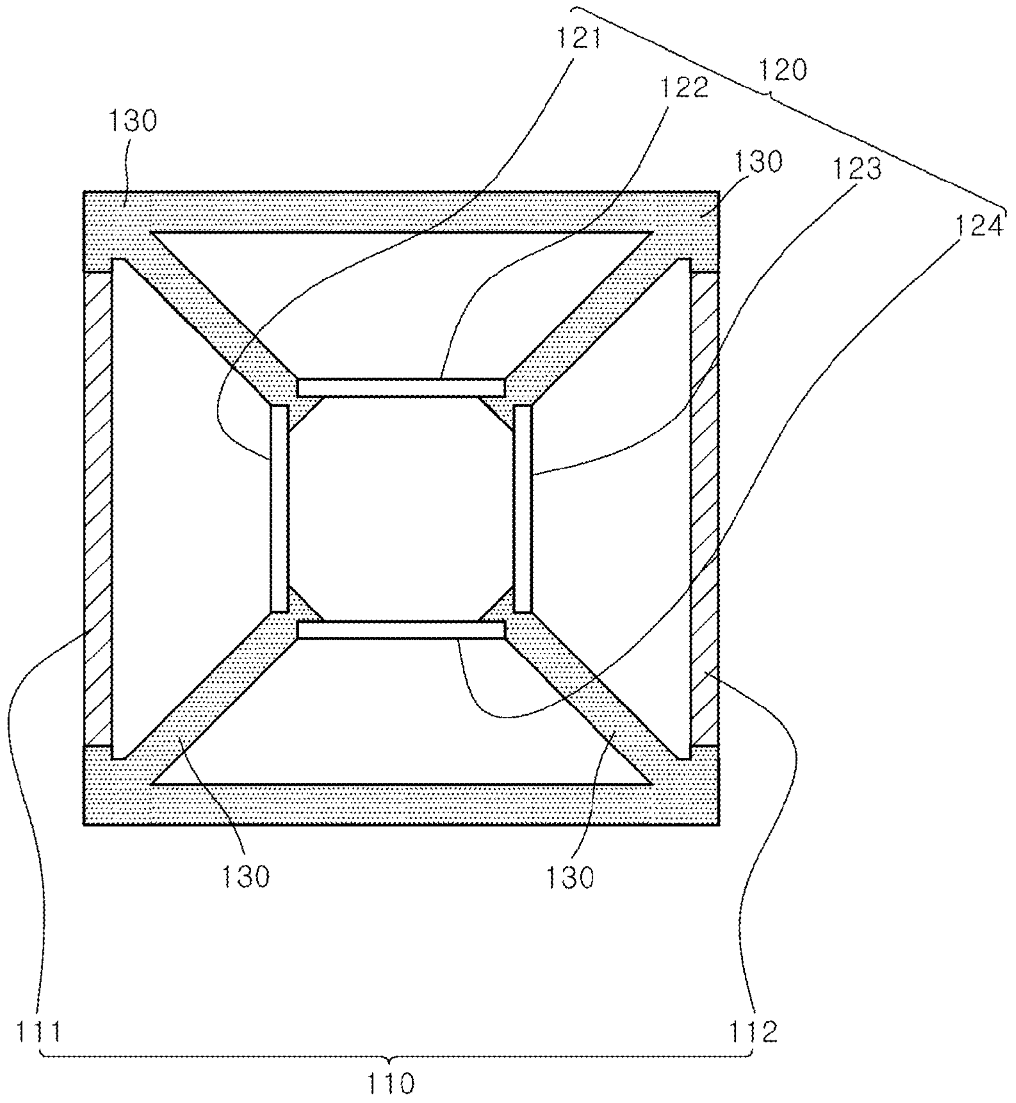
FIG. 1 is an exemplary diagram illustrating a cross sectional structure of a meta atom according to an exemplary embodiment of the present invention.

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

Hereinafter, referring to the accompanying drawings, an exemplary embodiment of meta atoms for controlling acoustic parameters and metamaterials comprising the same according to the present invention will be described. In the process, thicknesses of lines, sizes of constituent elements, and the like illustrated in the drawing may be exaggerated for clarity and convenience in explanation. In addition, the terminology to be described below is defined in consideration of functions in the present invention and may vary depending on a user's or operator's intention, or practice. Therefore, such terminology will be defined based on the overall description of the present invention.

Structures of a meta atom according to the exemplary embodiment may be obtained by designing independent structures which respectively affect only one eigenmode and combining the same on the basis of analysis on two eigenmodes corresponding to two wave parameters of a medium.

Specifically, wave parameters of an acoustic wave such as mass density and bulk modulus correspond to a velocity field and a pressure field respectively. A velocity field oscillates linearly in a direction parallel to a propagation direction of a wave and a pressure field oscillates radially. Therefore, it is necessary that metamaterials be configured of two independent resonance structures in the form of radiation in the same linear direction as a propagation direction of a wave and in the form of radiation in all directions in order to independently adjust mass density and bulk modulus.

FIG. 1 is an exemplary diagram illustrating a cross sectional structure of a meta atom according to an exemplary embodiment of the present invention. As seen in FIG. 1, a meta atom (a meta atom structure) according to an exemplary embodiment is configured of a first resonator assembly 110, a second resonator assembly 120, and partitions 130.

The first resonator assembly 110 has a resonator structure which affects a velocity field of an acoustic wave, and may include a pair of resonators configured of two resonators (resonator a 111 and resonator b 112) disposed apart from each other with respect to an axis direction.

In this case, two resonators (resonator a 111 and resonator b 112) in a pair of resonators may be disposed on the same axis, that is, parallel to each other. That is, when an acoustic wave propagating in a direction perpendicular to resonator a 111 and resonator b 112 passes through a meta atom according to an exemplary embodiment of the present invention, a velocity field is influenced by resonator a 111 and resonator b 112. For this reason, effective density is adjusted.

Meanwhile, the second resonator assembly 120 has a resonator structure which controls a eigenmode of a pressure field resonating in all directions, is positioned inside a pair of resonators included in the first resonator assembly 110, includes at least one resonator, and controls bulk modulus.

In this case, a resonator included in the second resonator assembly 120 may be disposed at a radial position from the center of a meta atom in order to affect a radially resonating pressure field.

Also, resonators included in the second resonator assembly 120 may be disposed in the form of a tangent to a circle (or a sphere) where the center of a meta atom is set as a center. That is, resonators included in the second resonator assembly 120 are disposed at the same distance from the center of a meta atom, and thus may control a eigenmode of a pressure field resonating in all directions.

In this case, resonators included in the first resonator assembly 110 and the second resonator assembly 120 may be formed as composite structures of one or two or more elements, wherein the element may be a bar, a membrane, a plate, or a Helmholtz's resonator, and by modifying specifications of such resonators, wave parameters and bianisotropy of an acoustic wave may be controlled. For example, when thin film resonators are used, by modifying effective thicknesses of resonators, wave parameters and bianisotropy of an acoustic wave may be controlled, detailed description of which will be made below.

Also, as illustrated in FIG. 1, the second resonator assembly 120 may be configured in the form including a pair of resonators (resonator1 121 and resonator3 123) disposed at positions facing a pair of resonators (resonator a 111 and resonator b 112) included in the first resonator assembly 110 and a pair of resonators (resonator2 122 and resonator4 124) disposed perpendicularly thereto.

In this case, a meta atom according to an exemplary embodiment of the present invention may be configured to support the first resonator assembly 110 and the second resonator assembly 120 by connecting partitions 130, which an acoustic wave cannot penetrate, between the first resonator assembly 110 and the second resonator assembly 120.

Also, a meta atom may be configured in the form of forming cells by the existence of partitions 130 at positions perpendicular to a pair of resonators (resonator a 111 and resonator b 112) included in the first resonator assembly 110 and facing a pair of resonators (resonator2 122 and resonator4 124) included in the second resonator assembly 120.

Figure 2:
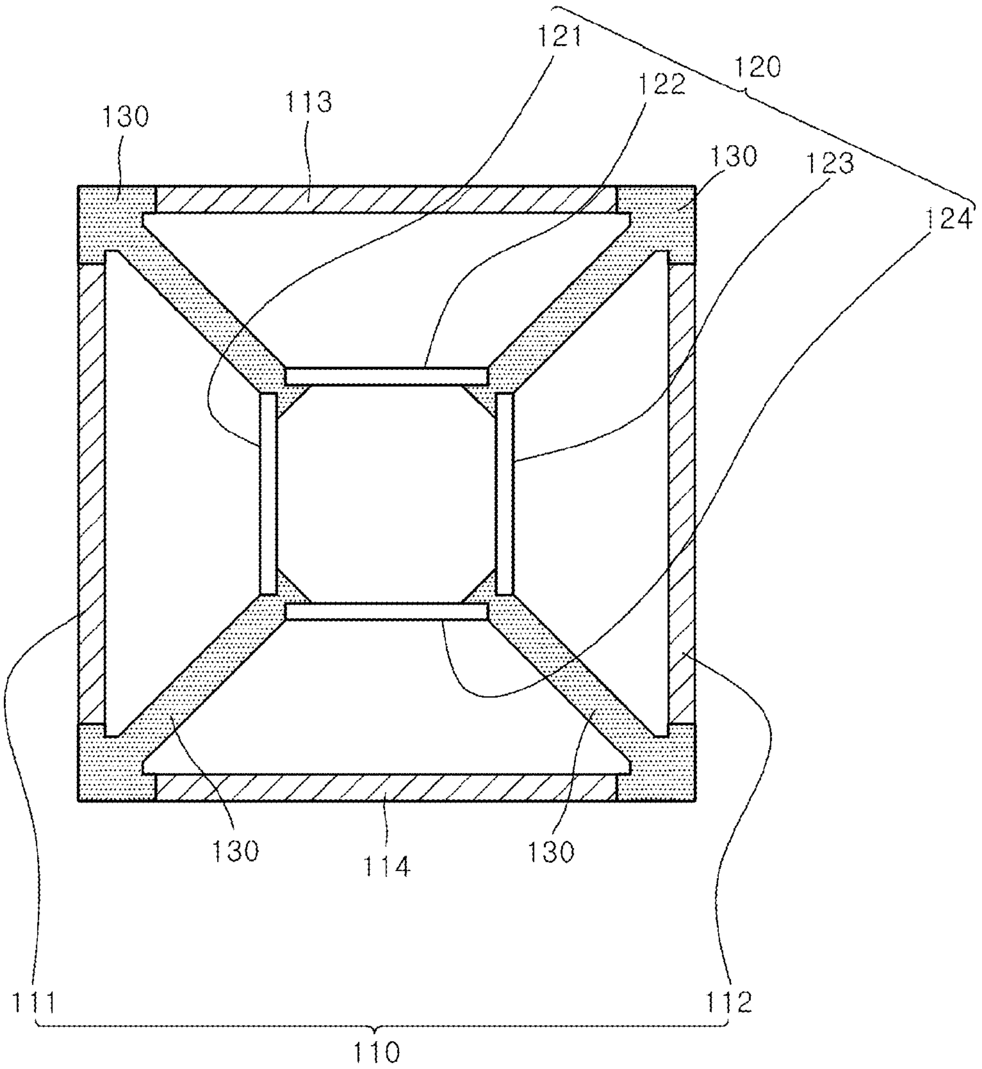
FIG. 2 is an exemplary diagram illustrating a cross sectional structure of a meta atom according to another exemplary embodiment of the present invention.

Or, as illustrated in FIG. 2, the first resonator assembly 110 may be configured of cells in the form of further including a pair of resonators (resonator c 113 and resonator d 114) at positions perpendicular to a pair of resonators (resonator a 111 and resonator b 112) included in the first resonator assembly 110 and facing a pair of resonators (resonator2 122 and resonator4 124) included in the second resonator assembly 120.

Through the above structures, effective density of an acoustic wave incident perpendicularly to a meta atom is adjusted by the first resonator assembly 110, and the bulk modulus of an acoustic wave incident perpendicularly to a meta atom is controlled by the second resonator assembly 120.

Figure 3:
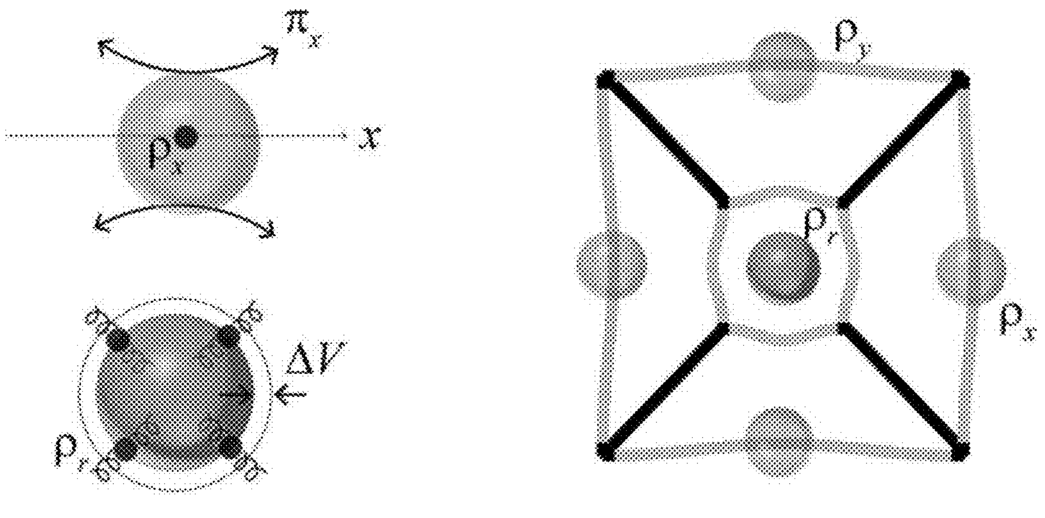
FIGS. 3 and 4 are exemplary diagrams illustrating effects of a meta atom according to an exemplary embodiment of the present invention.
Figure 4:
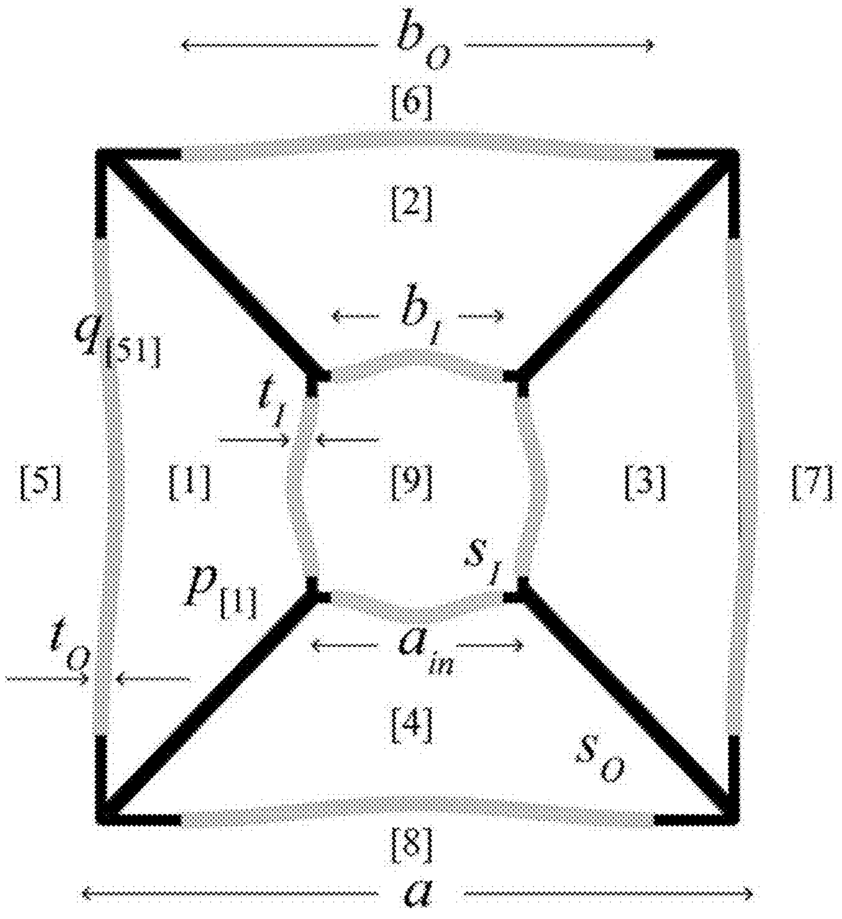

Specifically, an aluminum thin film is used as resonators included in the first resonator assembly 110 and the second resonator assembly 120, and when a situation in which a meta atom is two-dimensional as illustrated in FIGS. 3 and 4 is assumed, wave parameters and bianisotropy of an acoustic wave may be analyzed using coupled mode theory, the detailed descriptions of which are as follows.

First, a relational expression of individual resonators and cells (the law of conservation of mass and Newton's third law of motion) may be expressed by the following Equation 1.

$$B_0^{-1} a p_{[i]} s_{[i]} = \sum_k b_{[ik]} q_{[ik]} - \sum_k b_{[ji]} q_{[ji]},$$
$$-p_{Al} t_{[jk]} \omega^2 q_{[jk]} = p_{[k]} - p_{[j]}$$

[Equation 1]

(p is relative pressure inside a cell, q is the effective displacement of a thin film resonator, s is an area of a cell, a is a lattice constant of a meta atom, b and t are respectively a width and effective thickness of a thin film, $\rho_{Al}$ is mass density of a thin film, ω is an angular frequency, and the subscript denotes a location of a cell specified in FIG. 4.)

In an actually desired design, with respect to a specific relative refractive index n and a wave vector in a vacuum β, a wave which passes through a metamaterial undergoes a phase change in a propagation direction as much as exp(—iβna). That is, Floquet's boundary conditions of a metamaterial system may be denoted by the following Equation 2.

$$\frac{p_{[7]} + p_{[3]}}{p_{[5]} + p_{[1]}} = \frac{q_{[37]}}{q_{[51]}} = \exp(-i\beta_0 n_x a),$$
$$\frac{p_{[7]} + p_{[3]}}{p_{[5]} + p_{[1]}} = \frac{q_{[37]}}{q_{[51]}} = \exp(-i\beta_0 n_y a)$$

[Equation 2]

From such Equations 1 and 2, linear matrix equation through which a eigenmode of a metamaterial system is analyzable may be derived by the following Equation 3.

[Equation 3]

$$\begin{pmatrix}
1 & 0 & 0 & 0 & 0 & 0 & 0 & 0 & 0 & C_O & 0 & 0 & 0 & -C_O & 0 & 0 & 0 \\
0 & 1 & 0 & 0 & 0 & 0 & 0 & 0 & 0 & 0 & -C_O & 0 & 0 & 0 & C_O & 0 & 0 \\
0 & 0 & 1 & 0 & 0 & 0 & 0 & 0 & 0 & 0 & 0 & -C_O & 0 & 0 & 0 & C_O & 0 \\
0 & 0 & 0 & 1 & 0 & 0 & 0 & 0 & 0 & 0 & 0 & 0 & C_O & 0 & 0 & 0 & -C_O \\
0 & 0 & 0 & 0 & 0 & 0 & 0 & 0 & 1 & -C_I & C_I & C_I & -C_I & 0 & 0 & 0 & 0 \\
1 & 0 & 0 & 0 & -1 & 0 & 0 & 0 & 0 & 0 & 0 & 0 & 0 & M_O & 0 & 0 & 0 \\
1 & 0 & 0 & 0 & 0 & -1 & 0 & 0 & 0 & 0 & 0 & 0 & 0 & 0 & -M_O & 0 & 0 \\
0 & 0 & 1 & 0 & 0 & 0 & -1 & 0 & 0 & 0 & 0 & 0 & 0 & 0 & 0 & -M_O & 0 \\
0 & 0 & 0 & 1 & 0 & 0 & 0 & -1 & 0 & 0 & 0 & 0 & 0 & 0 & 0 & 0 & M_O \\
1 & 0 & 0 & 0 & 0 & 0 & 0 & 0 & -1 & -M_I & 0 & 0 & 0 & 0 & 0 & 0 & 0 \\
0 & 1 & 0 & 0 & 0 & 0 & 0 & 0 & -1 & 0 & M_I & 0 & 0 & 0 & 0 & 0 & 0 \\
0 & 0 & 1 & 0 & 0 & 0 & 0 & 0 & -1 & 0 & 0 & M_I & 0 & 0 & 0 & 0 & 0 \\
0 & 0 & 0 & 1 & 0 & 0 & 0 & 0 & -1 & 0 & 0 & 0 & -M_I & 0 & 0 & 0 & 0 \\
0 & 0 & 0 & 0 & 0 & 0 & 0 & 0 & 0 & 0 & 0 & 0 & 0 & e^{-i\beta_0 na} & 0 & -1 & 0 \\
0 & 0 & 0 & 0 & 0 & 0 & 0 & 0 & 0 & 0 & 0 & 0 & 0 & 0 & 1 & 0 & -1 \\
e^{-i\beta_0 na} & 0 & -1 & 0 & e^{-i\beta_0 na} & 0 & -1 & 0 & 0 & 0 & 0 & 0 & 0 & 0 & 0 & 0 & 0 \\
0 & 1 & 0 & -1 & 0 & 1 & 0 & -1 & 0 & 0 & 0 & 0 & 0 & 0 & 0 & 0 & 0
\end{pmatrix}$$

-continued $$\begin{pmatrix} p_{[1]} \\ p_{[2]} \\ p_{[3]} \\ p_{[4]} \\ p_{[5]} \\ p_{[6]} \\ p_{[7]} \\ p_{[8]} \\ p_{[9]} \\ q'_{[19]} \\ q'_{[92]} \\ q'_{[93]} \\ q'_{[49]} \\ q'_{[51]} \\ q'_{[26]} \\ q'_{[37]} \\ q'_{[84]} \end{pmatrix} = \begin{pmatrix} 0 \\ 0 \\ 0 \\ 0 \\ 0 \\ 0 \\ 0 \\ 0 \\ 0 \\ 0 \\ 0 \\ 0 \\ 0 \\ 0 \\ 0 \\ 0 \\ 0 \end{pmatrix}$$

where $C_I = \frac{B_0 a}{S_I}$, $C_0 = \frac{B_0 a}{S_O}$, $M_I = -\frac{\omega^2 a}{a_{in}}\left[\rho_{Al} t_I + \frac{\rho_0 S_O}{2a_{in}} + \frac{\rho_0 S_I}{4a_{in}}\right]$, $M_O = -2\omega^2\left[\rho_{Al} t_O + \frac{\rho_0 S_O}{2a}\right]$ and $q'_n = \frac{b_n}{a_n} q_n$.

In Equation 1 described above, when the above eigenvalue problem is solved using relational expressions $n=\sqrt{\rho B^{-1}}$, $Z=\sqrt{\rho B}$ among density ρ and bulk modulus B and a refractive index n and impedance Z, structure parameters b and t may be obtained to obtain desired wave parameters.

Meanwhile, for the shifting of decoupling operation center, meta atom may be placed in other larger unit cell. For example, according to the effective medium theory, meta atom placed in the square unit cell consist of background host medium having wave parameters $\rho_h, B_h^{-1}$ and unit length a shifts decoupling operation center from (0, 0) to $$\left(\rho_h\left(1 - \frac{a}{a_h}\right), B_h^{-1}\left(1 - \frac{a^2}{a_h^2}\right)\right).$$

Meanwhile, bianisotropy is a characteristic related to a coupling strength of two fields of a wave, and may be realized by asymmetrically applying coupling of a eigenmode of two fields.

Specifically, an acoustic wave has a characteristic of a longitudinal wave which oscillates in a direction parallel to a propagation direction of a wave, bianisotropy may be obtained by applying asymmetry in a propagation direction of a wave. Therefore, in an exemplary embodiment of the present invention, a pair of resonators (resonator a 111 and resonator b 112) included in the first resonator assembly 110 and a pair of resonators (resonator1 121 and resonator3 123) disposed at positions facing the same may have asymmetric resonance characteristics.

Specifically, the effective mass of resonators can have asymmetry, and for example, when an aluminum thin film resonator is employed, bianisotropy may be obtained by applying predetermined asymmetry to effective thicknesses of resonators.

That is, when asymmetry as much as Δt is applied to effective thicknesses of resonator1 121 and resonator3 123 (i.e., by making a difference as much as Δt between the effective thickness of resonator1 121 and the effective thickness of resonator3 123), bianisotropy may be obtained, interpretations of which through coupled mode theory will be described below.

Bianisotropy is defined as $\xi=in(Z_+-Z_-)/(Z_++Z_-)$ from impedance according to a refractive index and a propagation direction of a wave, under a condition of designing desired mass density and bulk modulus when asymmetry as much as Δt is given, equations of motion and Floquet boundary conditions may be obtained, interpretations of which with respect to bianisotropy will be described by the following Equation 4.

[Equation 4]

$$\xi \sim -2c_O \frac{C_O^2}{a\omega}(M_I + C_O + 2C_I)$$

$$\Delta M \frac{1}{F} \log\left[\frac{1}{2C_I C_O^2 (M_I + C_O)(G - F)}\right]$$

$$F = \sqrt{(M_I + C_O)(H - K + 2C_I(2H - K + 2C_I(2H - K)))},$$

where $$G = (M_I + C_O)(H - K) + 2C_I(2H - K + 2M_{IC_O} + C_O^2), \text{ and}$$

$$\Delta M = -\frac{a\omega^2 \rho_{Al}}{a_{in}} \Delta t$$

$$H = (M_I + C_O)(2M_{IC_O} + M_{O(M_I + C_O)}),$$

$$K = (M_O + 2C_O)\Delta M^2,$$

With a linear approximation of the Equation 4, a relational expression may be obtained as the following Equation 5.

$$\xi = \frac{4c_0C_I}{a\omega\sqrt{\Delta M^2 + 16C_I^2}} \log\left[1 + \frac{\Delta M^2}{8C_I^2} + \frac{\Delta M\sqrt{\Delta M^2 + 16C_I^2}}{C_I^2}\right] \sim \frac{c_0}{2aC_I\omega}\Delta M = -\frac{c_0S_{in}\omega\rho_{Al}}{B_0 2aa_{in}}\Delta t \quad \text{[Equation 5]}$$

Also, in an exemplary embodiment of the present invention, even when resonance characteristics of resonator a 111 and resonator b 112 are asymmetrically designed, or asymmetry is provided to both resonance characteristics of resonator a 111 and resonator b 112 and resonance characteristics of resonator1 121 and resonator3 123, bianisotropy may be obtained.

Meanwhile, a method for adjusting characteristics of meta atoms in the present invention is not limited to controlling resonance characteristics of resonators. For example, characteristics of a meta atom may be controlled by adjusting a type of fluid present inside a cell, a pressure of a cell, or a volume of a cell.

Specifically, when different types of fluid are used, the bulk modulus in Equation 1 is changed. Also, in an adiabatic process, since the bulk modulus of a fluid is proportional to an equilibrium pressure, adjusting the pressure of a cell is effective for controlling the bulk modulus of a fluid. Additionally, a volume of a cell is a structural parameter, and is a cross-sectional area s in Equation 1 which assumes 2-dimensional meta atoms. Summarizing the above description, a continuity equation in a three-dimensional meta atom using thin film resonators is the same as shown in Equation 6.

$$\frac{aV_{[i]}p_{[i]}}{\gamma_{[i]}P_{0[i]}} = \sum_k b_{[ik]}h_{[ik]}q_{[ik]} - \sum_k b_{[jk]}h_{[jk]}q_{[jk]} \quad \text{[Equation 6]}$$

In this case, V is a volume of a cell, h is a height of a thin film resonator, γ is a specific heat ratio of a fluid, and $P_0$ is an equilibrium pressure of a cell.

Figure 5:
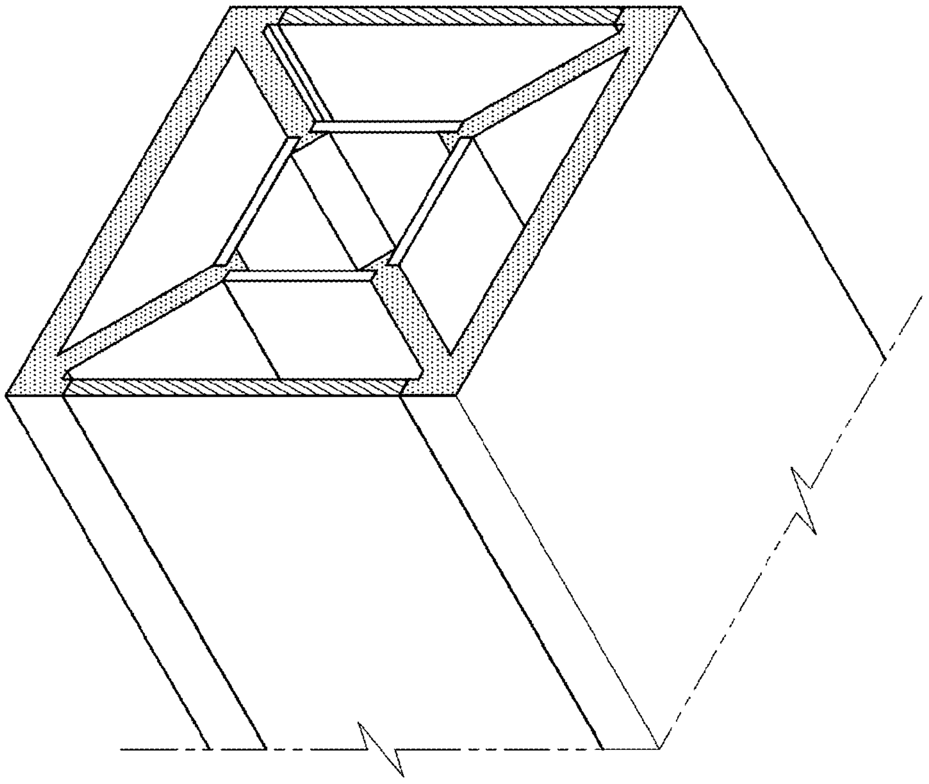
FIG. 5 is a perspective view illustrating a structure of a meta atom according to an exemplary embodiment of the present invention.

Meanwhile, a meta atom according to an exemplary embodiment of the present invention may be the form shown in FIG. 5, detailed properties and the utilization of such a meta atom is described as follows.

Figure 6:
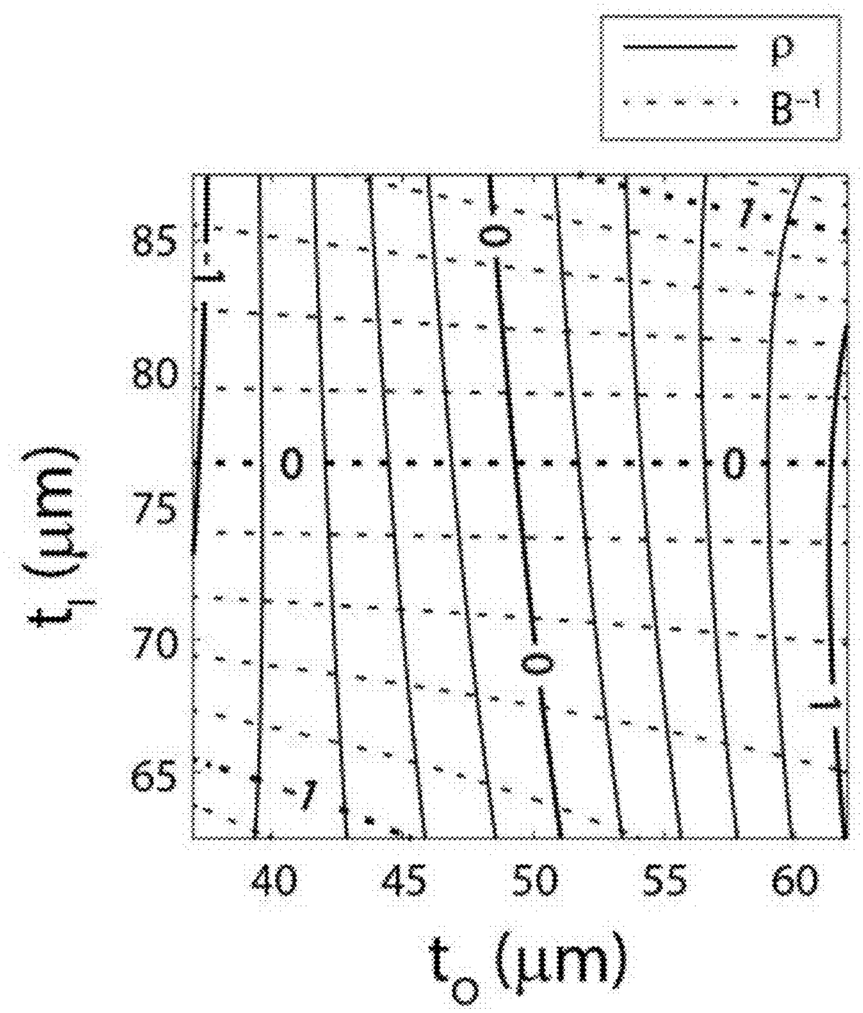
FIGS. 6 and 7 are an exemplary diagram illustrating variations of wave parameters based on parameter control using a meta atom according to an exemplary embodiment of the present invention.
Figure 7:
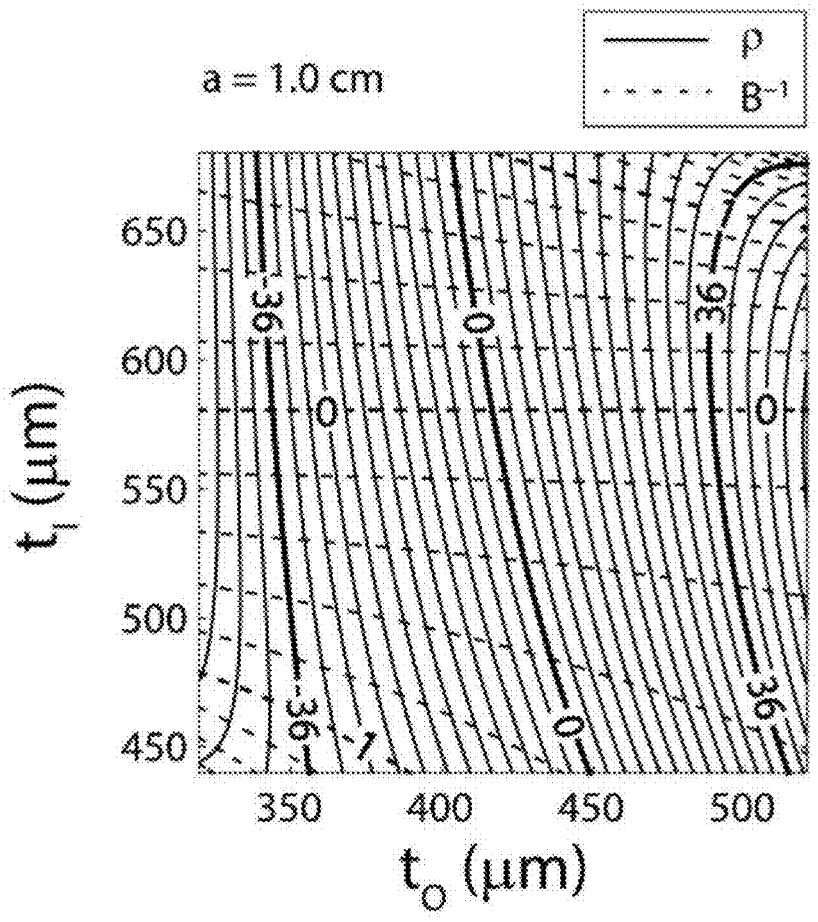

FIGS. 6 and 7 are an exemplary diagram illustrating variations of wave parameters based on parameter control using a meta atom according to an exemplary embodiment of the present invention, wherein variations of wave parameters are shown when thin film resonators having first and second effective thicknesses are disposed in the first resonator assembly 110 and the second resonator assembly 120 respectively. As seen in FIG. 6, in the case of a structure having a lattice constant of 60 mm at a frequency of 1300 Hz, wave parameters of −1.0 to +1.0 may be each independently obtained in thicknesses of 60 to 90 um and 35 to 65 um. Additionally, when smaller lattice constant and thicker thickness of membrane are used, the range of density control may broaden. Specifically, as seen in FIG. 7, in the case of a structure having lattice constant reduced by one sixth and 6 times increased membrane thickness, wave parameters of 36 times broadened may be obtained.

Figure 8:
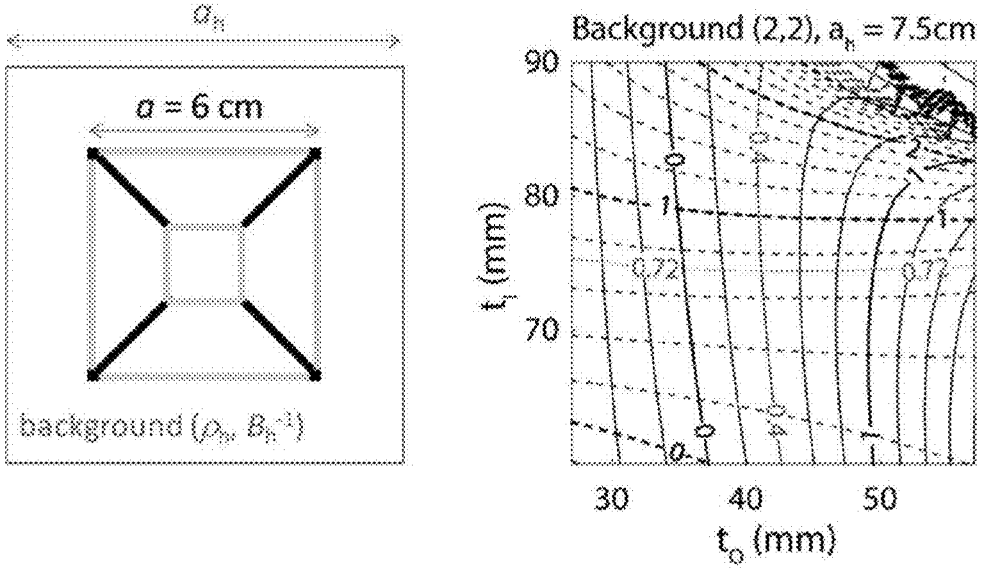
FIG. 8 is an exemplary diagram illustrating exemplary embodiment of the shifting of the center of decoupling operation using extended unit cell.

FIG. 8 is an exemplary diagram illustrating shifting of the center of decoupling operation using extended unit cell consist of background host medium according to exemplary embodiment of the present invention. As seen in FIG. 8, meta atom in the background host medium of 25% increased unit length and wave parameters (2, 2), shifts the center of decoupling operation by (0.4, 0.72).

Figure 9:
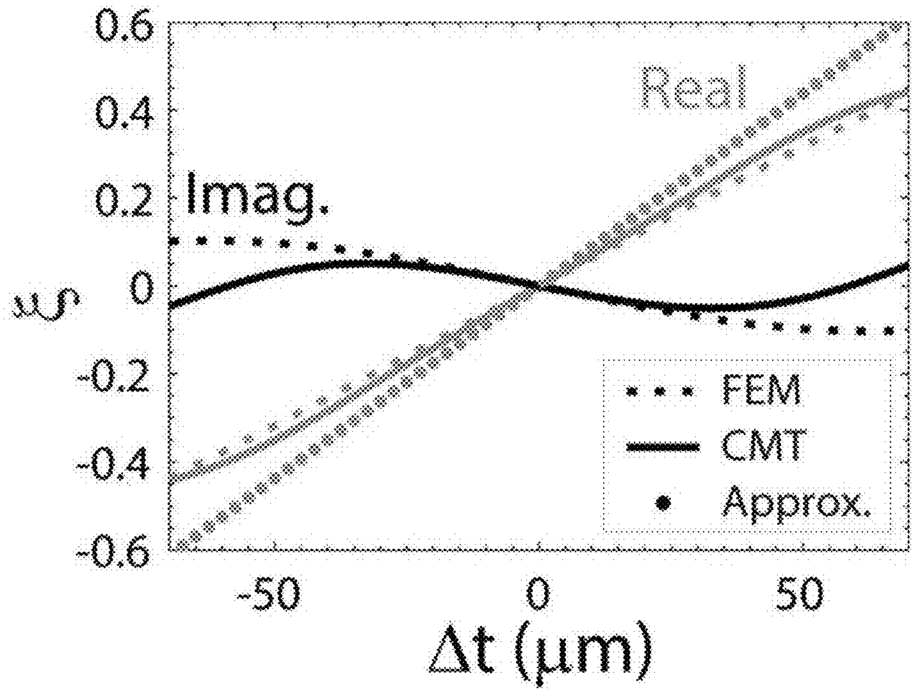
FIG. 9 is an exemplary diagram illustrating variations of wave parameters based on parameter control using a meta atom according to an exemplary embodiment of the present invention.

FIG. 9 is an exemplary diagram illustrating variations of wave parameters based on parameter control using a meta atom according to an exemplary embodiment of the present invention (in the case of having bianisotropy), wherein when respective effective thicknesses of a pair of thin film resonators are asymmetrically designed as much as ±Δt/2, variations of wave parameters are shown. A bianisotropy parameter according to an asymmetric thickness Δt in a state of a zero refractive index is the same as illustrated in FIG. 9, in which case, a bianisotropy parameter can be seen as linear near zero.

Figure 10:
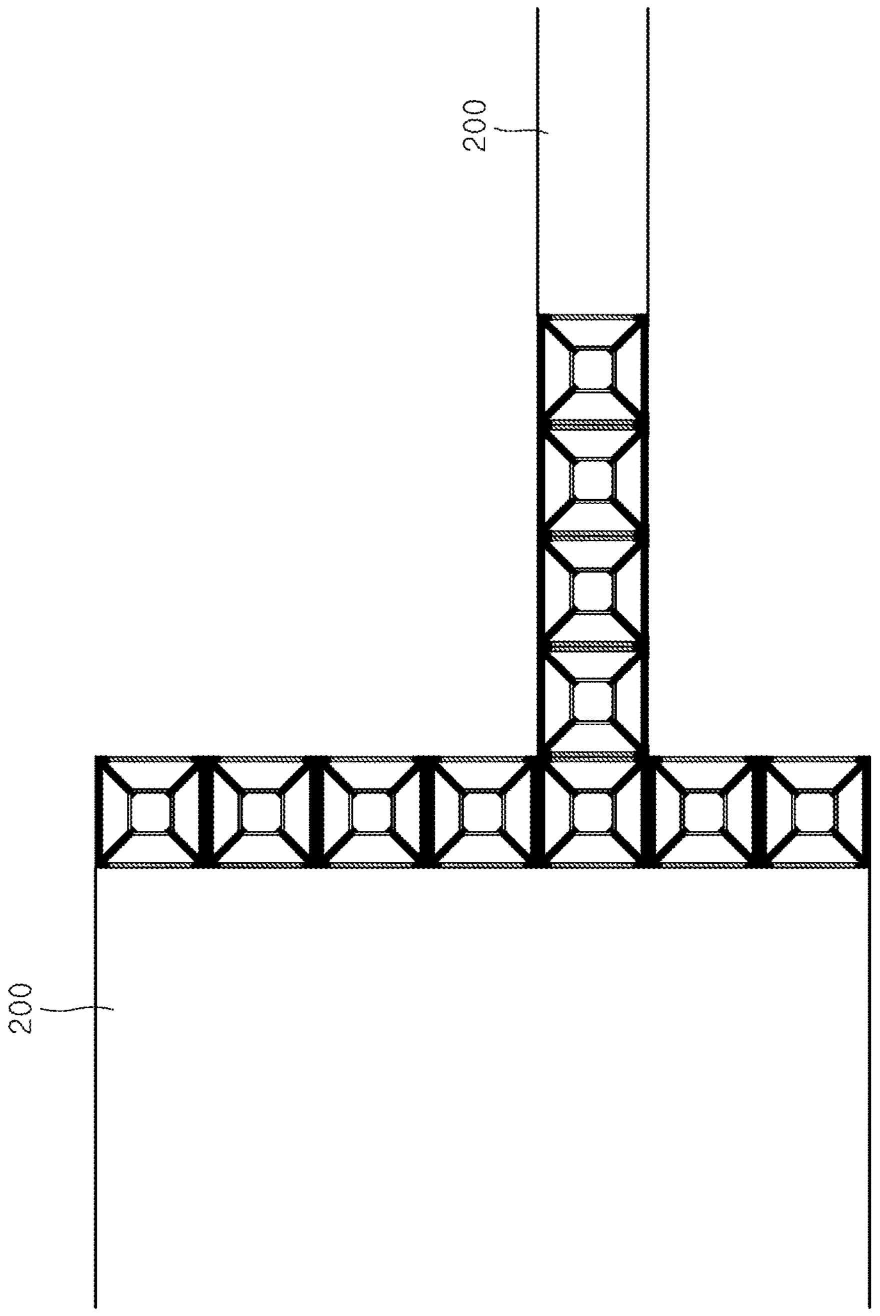
FIG. 10 is an exemplary diagram illustrating impedance matching of acoustic waveguides using a metamaterial according to an exemplary embodiment of the present invention.
Figure 11:
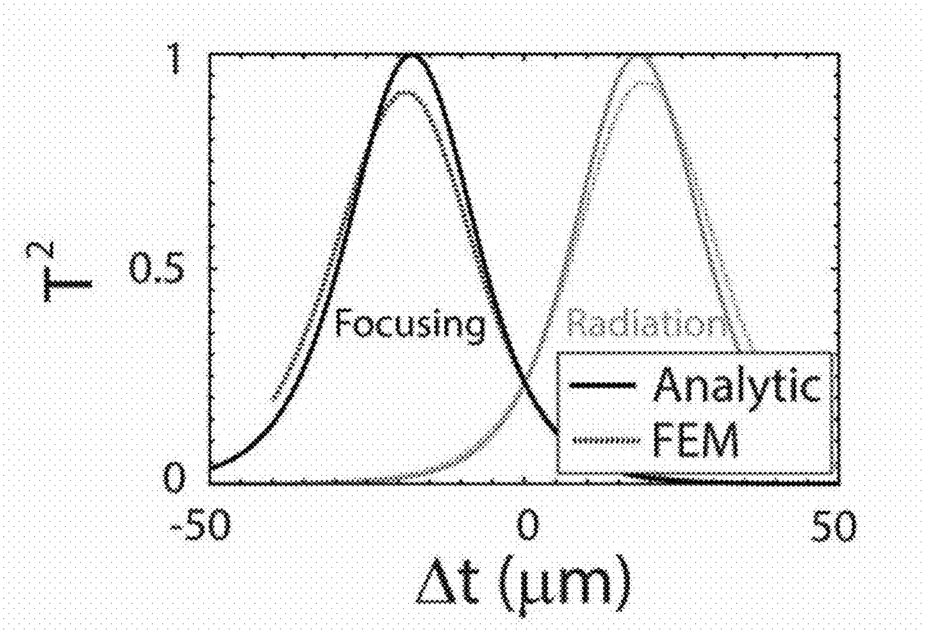
FIG. 11 is an exemplary diagram illustrating effects of impedance matching of acoustic waveguides using a metamaterial according to an exemplary embodiment of the present invention.
Figure 12:
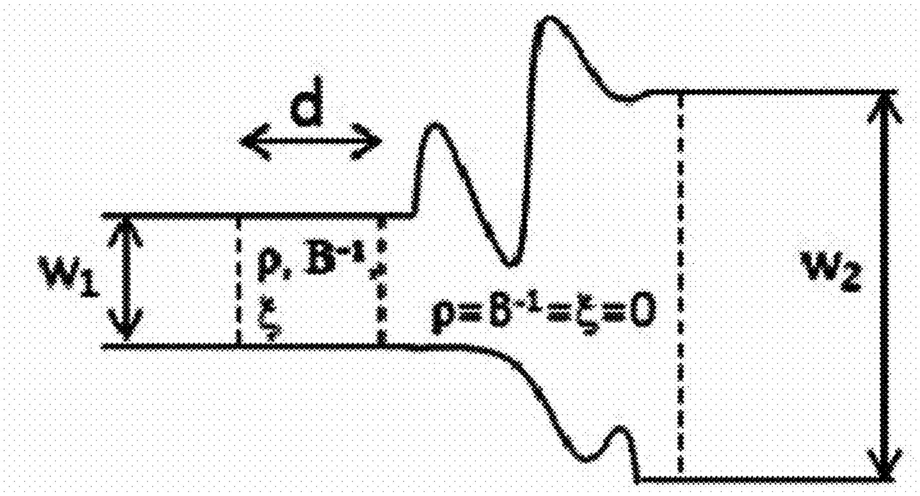
FIG. 12 is an exemplary diagram illustrating an impedance matching phenomenon through the exchange of energy between a velocity field and a pressure field by bianisotropy.

FIG. 10 is an exemplary diagram illustrating impedance matching of acoustic waveguides using a metamaterial according to an exemplary embodiment of the present invention, FIG. 11 is an exemplary diagram illustrating effects of impedance matching of acoustic waveguides using a metamaterial according to an exemplary embodiment of the present invention, and FIG. 12 is an exemplary diagram illustrating a impedance matching phenomenon through the exchange of energy between a velocity field and a pressure field by bianisotropy.

That is, metamaterials capable of impedance matching of acoustic waveguides using a meta atom according to an exemplary embodiment of the present invention (in the case of having bianisotropy) may be produced, and FIG. 10 represents impedance matching of waveguides using zero refractive index metamaterials.

In the boundary between media having different impedance from each other, wave reflection is determined by $$R = \frac{Z_1 - Z_2}{Z_1 + Z_2}.$$

Since impedance of an acoustic waveguide 200 is proportional to a cross-sectional area of a waveguide, when acoustic waveguides 200 having a different cross-sectional area from each other is directly connected, some propagated acoustic waves are reflected and only the rest are transmitted by the impedance difference. At this time, as shown in FIG. 10, when coupling between two waveguides having different cross-sectional areas using bianisotropy and zero refractive index meta atoms, impedance matching by which a wave is allowed to be transmitted 100% except its own loss is possible.

As illustrated in FIG. 11, when acoustic waveguides 200 in which a difference in cross-sectional area (and impedance) is as much as 14 times are connected, transmittance may be maximized using bianisotropy, zero refractive index meta atoms while only 50% of energy is transmitted in the case of direct connection (In FIG. 11, Δt=0).

Such perfect transmission, as illustrated in FIG. 12, occurs because while two fields having an energy ratio according to the impedance of input waveguides pass through bianisotropy metamaterials, exchanging energy with each other, a ratio of a magnitude of two fields is changed, and ultimately, two fields have an energy ratio consistent with the impedance of output waveguides.

Figure 13:
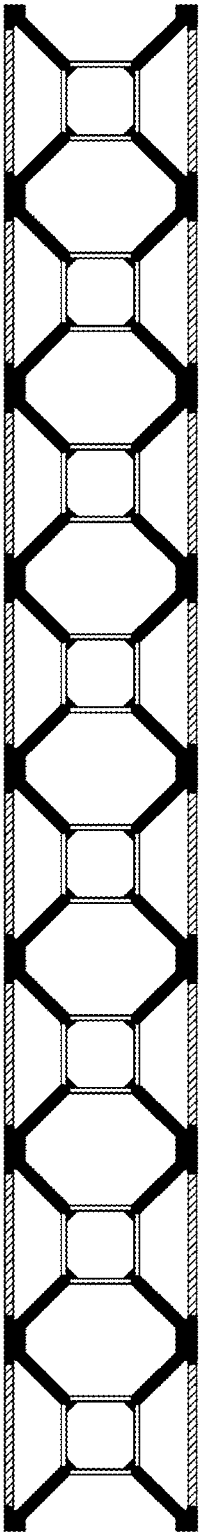
FIG. 13 is an exemplary diagram illustrating acoustic metasurfaces according to an exemplary embodiment of the present invention.
Figure 14:
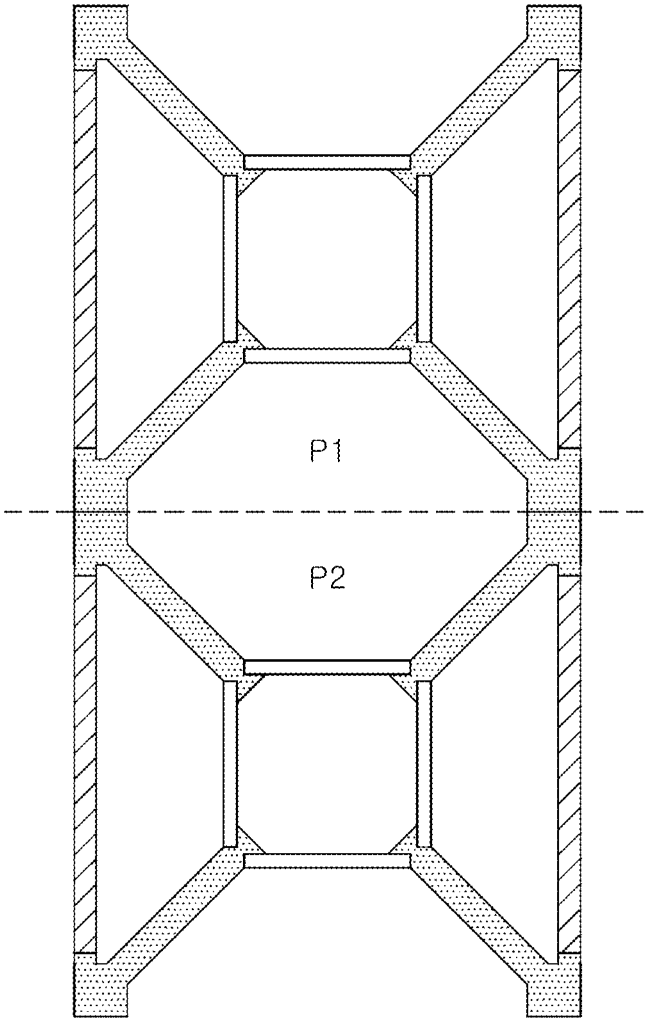
FIG. 14 is an exemplary diagram illustrating a cross sectional structure of a meta atom according to still another exemplary embodiment of the present invention.
Figure 15:
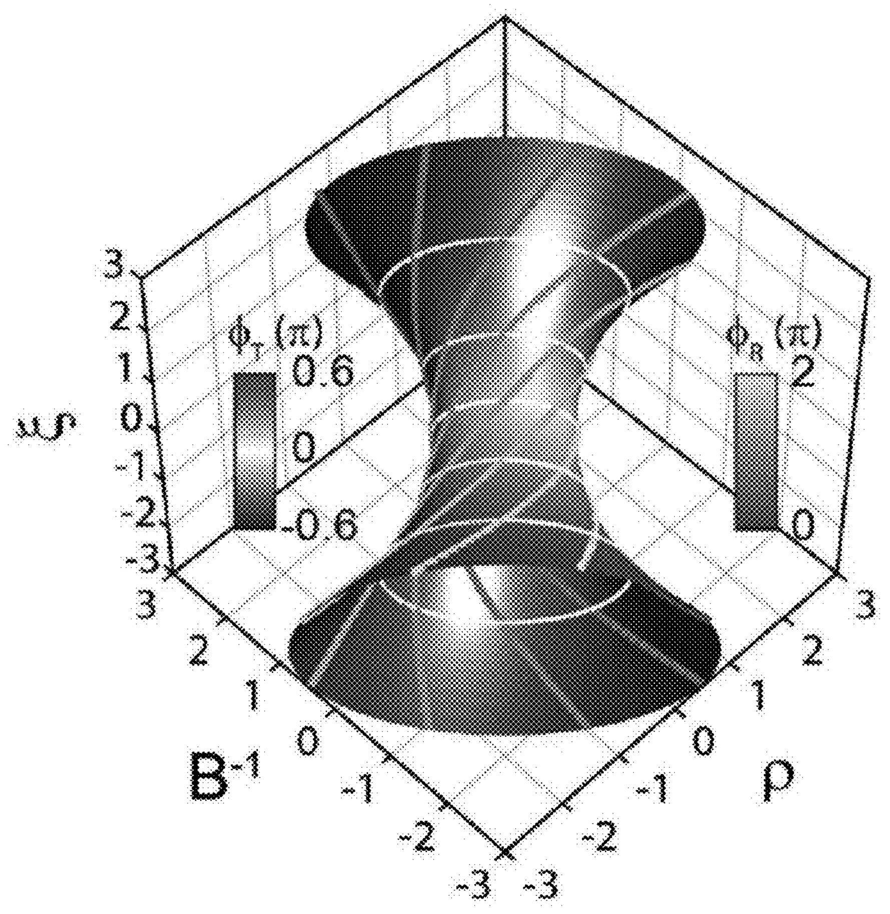
FIGS. 15 and 16 are exemplary diagrams illustrating parameter control through acoustic metasurfaces according to an exemplary embodiment of the present invention.
Figure 16:
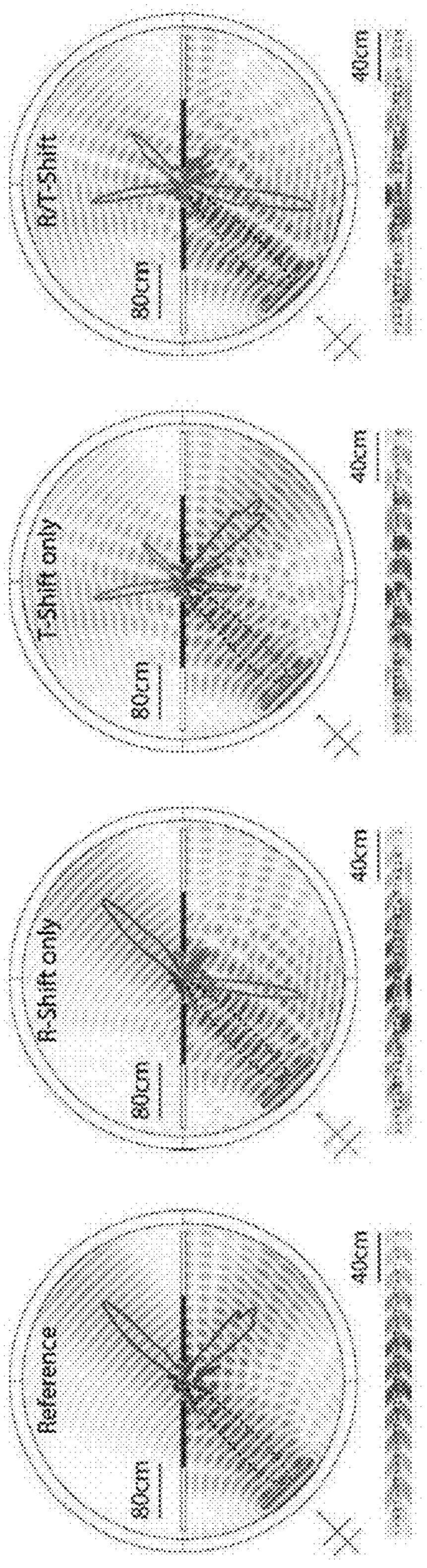

FIG. 13 is an exemplary diagram illustrating acoustic metasurfaces according to an exemplary embodiment of the present invention, FIG. 14 is an exemplary diagram illustrating a cross sectional structure of a meta atom according to still another exemplary embodiment of the present invention, and FIGS. 15 and 16 are exemplary diagrams illustrating parameter control through acoustic metasurfaces according to an exemplary embodiment of the present invention.

That is, metasurfaces may be realized using meta atoms for controlling wave parameters or meta atoms for controlling bianisotropy and wave parameters, particularly, metasurfaces controlling transmission and reflection independently may be realized using meta atoms for controlling bianisotropy and wave parameters.

Meanwhile, as seen in FIGS. 13 and 14, in the case of a one-dimensional structure or one-dimensionally acting as in a metasurface, partitions 130 or a pair of resonators (resonator c 113 and resonator d 114) may not be present at positions perpendicular to a pair of resonators (resonator a 111 and resonator b 112) included in the first resonator assembly 110 and facing a pair of resonators (resonator2 122 and resonator4 124) included in the second resonator assembly 120.

In this case, as seen in FIG. 14, since pressure of cells which meta atoms adjacent thereto share can be seen as the same (that is, P1=P2 in FIG. 14), even when partitions 130 at the sides or a pair of resonators (resonator c 113 and resonator d 114) are not present, it may act as a metamaterial which can adjust wave parameters and bianisotropy.

In other words, when the pressure of cells which meta atoms adjacent thereto share can be seen as the same, structures may be modified into structures not having partitions 130 at the sides or a pair of resonators (resonator c 113 and resonator d 114).

In this manner, materials which are capable of adjusting wave parameters and bianisotropy may each independently control the amplitudes and phases of a reflected wave and a transmitted wave with respect to an incident wave. FIG. 15 shows values of mass density, bulk modulus, and bianisotropy of an acoustic wave incident to a meta atom for reflection and transmission at an intensity of 50:50, and the corresponding phases of a reflected wave and a transmitted wave.

Also, when metasurfaces are configured of an arrangement of metasurfaces capable of controlling a whole range of wave parameters, a specific reflection and transmission may be obtained through independent phase modulation of a reflected wave and a transmitted wave as in FIG. 16.

Meanwhile, Huygens' surfaces similar to such metasurfaces match impedance by controlling two wave parameters, and adjust reflection properties to obtain perfect transmission. Since bianisotropy is not addressed in this case, reflection and transmission properties are not completely independent. That is, Huygens' surfaces are included on the plane in which is $\xi$ in FIG. 15, and exemplary embodiments according to the present invention represent a more general case than this.

In this manner, meta atoms for controlling acoustic parameters and metamaterials comprising the same according to the present invention are effective for independently controlling two wave parameters of an acoustic wave through a first resonator assembly affecting a velocity field of an acoustic wave and a second resonator assembly affecting a pressure field of an acoustic wave.

Also, meta atoms for controlling acoustic parameters and metamaterials comprising the same according to the present invention are effective for controlling the bianisotropy of an acoustic wave when a certain pair of resonators has an asymmetric resonance characteristic.

Although the present invention is described referring to exemplary embodiments illustrated in the drawings, the above-described descriptions are only exemplary, and therefore, it should be understood by those skilled in the art that the above-described descriptions may be implemented with various modifications and equivalent another exemplary embodiment. Therefore, the technical protection scope of the present invention will be defined by following claims.

What is claimed:

1. A meta atom comprising:

a first resonator assembly having a pair of resonators configured of two resonators disposed apart from each other with respect to an axis direction;

a second resonator assembly positioned inside the pair of resonators included in the first resonator assembly, and having at least one resonator; and partitions connected between the first resonator assembly and the second resonator assembly, and supporting the first and second resonator assemblies.

2. The meta atom according to claim 1, wherein the two resonators in the pair of resonators included in the first resonator assembly are disposed on the same axis.

3. The meta atom according to claim 2, further comprising:

partitions or a resonator, wherein the partitions or the resonator is disposed on an axis perpendicular to the axis on which the two resonators are disposed.

4. The meta atom according to claim 1, wherein resonators included in the second resonator assembly are disposed at radial positions from a center of a meta atom.

5. The meta atom according to claim 4, wherein resonators included in the second resonator assembly are disposed at the same distance from the center of a meta atom.

6. The meta atom according to claim 1, wherein the second resonator assembly comprises a pair of resonators disposed at positions facing the pair of resonators included in the first resonator assembly.

7. The meta atom according to claim 6, wherein one or more of the pair of resonators included in the first resonator assembly and the pair of resonators included in the second resonator assembly have an asymmetric resonance characteristic.

8. The meta atom according to claim 7, wherein a pair of resonators having an asymmetric resonance characteristic have different effective masses from each other.

9. The meta atom according to claim 6, wherein the second resonator assembly further comprises a pair of resonators disposed perpendicularly to the pair of resonators disposed at the facing positions.

10. The meta atom according to claim 1, wherein resonators included in the first and second resonator assemblies are formed as composite structures of one or two or more elements, and the element is a bar, a membrane, a plate, or a Helmholtz's resonator.

11. The meta atom according to claim 1, wherein the partitions are capable of blocking transmission of an acoustic wave.

12. The meta atom according to claim 1, further comprising extended unit cell, wherein the unit cell consists of background media.

13. The meta atom according to claim 1, wherein the meta atom is capable of controlling wave parameters and bianisotropy of an acoustic wave by adjusting a type of fluid, ambient pressure of a fluid, an area of a cell, or a volume of a cell in individual cells surrounded by resonators and partitions.

14. A metamaterial comprising one or more of the meta atom according to claim 1.

15. The metamaterial according to claim 13, wherein the metamaterial is an acoustic coupler or an acoustic metasurface.

* * * * *